United States Patent
Neale

(10) Patent No.: US 6,874,840 B2
(45) Date of Patent: Apr. 5, 2005

(54) STOW TO FLOOR SEAT ASSEMBLY HAVING A CANTILEVERED SEAT CUSHION

(75) Inventor: Colin G. Neale, Northville, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 10/450,206
(22) PCT Filed: Dec. 11, 2001
(86) PCT No.: PCT/US01/47887
§ 371 (c)(1), (2), (4) Date: Dec. 15, 2003
(87) PCT Pub. No.: WO02/47937
PCT Pub. Date: Jun. 20, 2002

(65) Prior Publication Data
US 2004/0108755 A1 Jun. 10, 2004

Related U.S. Application Data
(60) Provisional application No. 60/255,365, filed on Dec. 11, 2000.

(51) Int. Cl.$^7$ .............................. B60N 2/10; B60N 2/20
(52) U.S. Cl. .................. 296/66; 296/65.01; 296/65.09; 297/15; 297/378.13
(58) Field of Search ............................... 296/66, 65.09, 296/65.01, 65.05, 67, 65.16; 297/15, 129, 378.1, 378.13, 344.1

(56) References Cited

U.S. PATENT DOCUMENTS

| | | | |
|---|---|---|---|
| 3,880,464 A | * | 4/1975 | Murphy et al. ............. 297/326 |
| 3,957,312 A | | 5/1976 | Bonnaud |
| 4,312,537 A | | 1/1982 | Lindenberg |
| 4,627,656 A | | 12/1986 | Gokimoto et al. |
| 4,699,418 A | * | 10/1987 | Plavetich ................. 296/65.09 |
| 4,793,649 A | | 12/1988 | Yamano et al. |
| 4,869,541 A | * | 9/1989 | Wainwright ............. 296/65.09 |
| 4,979,773 A | * | 12/1990 | Eubank .................... 296/65.05 |
| 5,195,795 A | * | 3/1993 | Cannera et al. .......... 296/65.09 |
| 5,383,699 A | * | 1/1995 | Woziekonski et al. ... 296/65.09 |
| 5,482,349 A | | 1/1996 | Richter et al. |
| 5,492,386 A | * | 2/1996 | Callum ........................ 296/64 |
| 5,570,931 A | * | 11/1996 | Kargilis et al. ......... 297/378.12 |
| 5,681,077 A | * | 10/1997 | Hashimoto ................... 297/15 |
| 5,810,416 A | | 9/1998 | Hashimoto |
| 5,934,732 A | | 8/1999 | Jakubiec |
| 6,070,934 A | | 6/2000 | Schaefer et al. |
| 6,089,641 A | | 7/2000 | Mattarella et al. |
| 6,106,046 A | | 8/2000 | Reichel |
| 6,123,380 A | | 9/2000 | Sturt et al. |
| 6,293,603 B1 | * | 9/2001 | Waku et al. ............. 296/65.09 |
| 6,375,255 B1 | * | 4/2002 | Maruta et al. ................. 297/15 |

FOREIGN PATENT DOCUMENTS

EP 0 745 506 A2 5/1996

* cited by examiner

Primary Examiner—D. Glenn Dayoan
Assistant Examiner—Greg Blankenship
(74) Attorney, Agent, or Firm—Clark Hill PLC

(57) ABSTRACT

A seat assembly for use in an automative vehicle comprising a seat back and a seat cushion pivotally coupled to the seat back. A pivot bracket is fixedly secured to each opposite lateral side of the seat back for supporting the seat assembly between opposing lateral side walls within the interior of the vehicle. Each pivot bracket includes a support flange for supporting the seat cushion cantilevered from the pivot bracket. A hook portion engages a latch post on the lateral side walls to retain the seat assembly in an upright seating position. A pivot flange is pivotally coupled to a main pivot post on the lateral side walls for pivoting the seat assembly between the upright seating position to a stow-to-floor position wherein the seat cushion is pivoted forwardly and downwardly to be supported on the floor of the vehicle and the seat back is pivoted against the seat cushion to form an extended cargo load floor.

9 Claims, 5 Drawing Sheets

STOW TO FLOOR SEAT ASSEMBLY HAVING A CANTILEVERED SEAT CUSHION

This application claims the benefit of Provisional Application No. 60/255,365, filed Dec. 11, 2005.

BACKGROUND OF THE INVENTION

1. Field of Invention

The present invention relates to a stow to floor seat assembly for an automotive vehicle having a cantilevered seat cushion.

2. Description of the Related Art

Seat assemblies for automotive vehicles commonly including one or more rows of rear seat assemblies including a seat cushion and a seat back coupled to the seat cushion. It is often desirable to pivot or fold both the seat cushion and seat back downwardly and against the floor of the vehicle to a fold flat position providing a cargo load floor in the vehicle. Typically, the seat cushion is pivotally coupled to the floor of the vehicle by seat risers for pivotal movement between a generally horizontal seating position and a forwardly folded and upright position. Further, the seat back is commonly pivotal between a generally upright seating position and a forwardly folded flat position adjacent the upright seat cushion.

It is also commonly known to have the entire seat assembly fold flat against the floor of the vehicle. Fold flat means to have the seat cushion moveable between the seating position and a stowed position lying adjacent the floor of the vehicle and to have the seat back moveable between the upright seating position and a forwardly folded flat position overlying the seat cushion in the stowed position. However, multiple or otherwise complex latching mechanisms are typically used for releasably locking the seat cushion and seat back in the respective seating positions. An example of such a seat assembly is found in U.S. Pat. No. 4,793,649, which issued to Yamano et al. on Dec. 27, 1988.

It remains desirable to provide a fold flat seat assembly moveable and selectively lockable between the seating position and the stowed position without the use of multiple or complex latching mechanisms.

SUMMARY OF THE INVENTION

The present invention relates to a stowable seat assembly for supporting occupants above a floor and between opposing lateral side walls of an automotive vehicle. The seat assembly includes a seat back extending between opposite lateral sides and a seat cushion pivotally coupled to the seat back. A pivot bracket is fixedly secured to each of the opposite lateral sides of the seat back for supporting the seat assembly between the opposing side walls of the vehicle. Each of the pivot brackets includes a support flange for supporting the seat cushion cantilevered from the pivot bracket spaced above the floor and a pivot flange adapted to be pivotally coupled to a main pivot post on the respective lateral side walls of the vehicle for pivoting the seat assembly between an upright seating position and a stow-to-floor position wherein the seat cushion is pivoted forwardly and downwardly to be supported on the floor and the seat back is pivoted against the seat cushion to form an extended cargo load floor.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
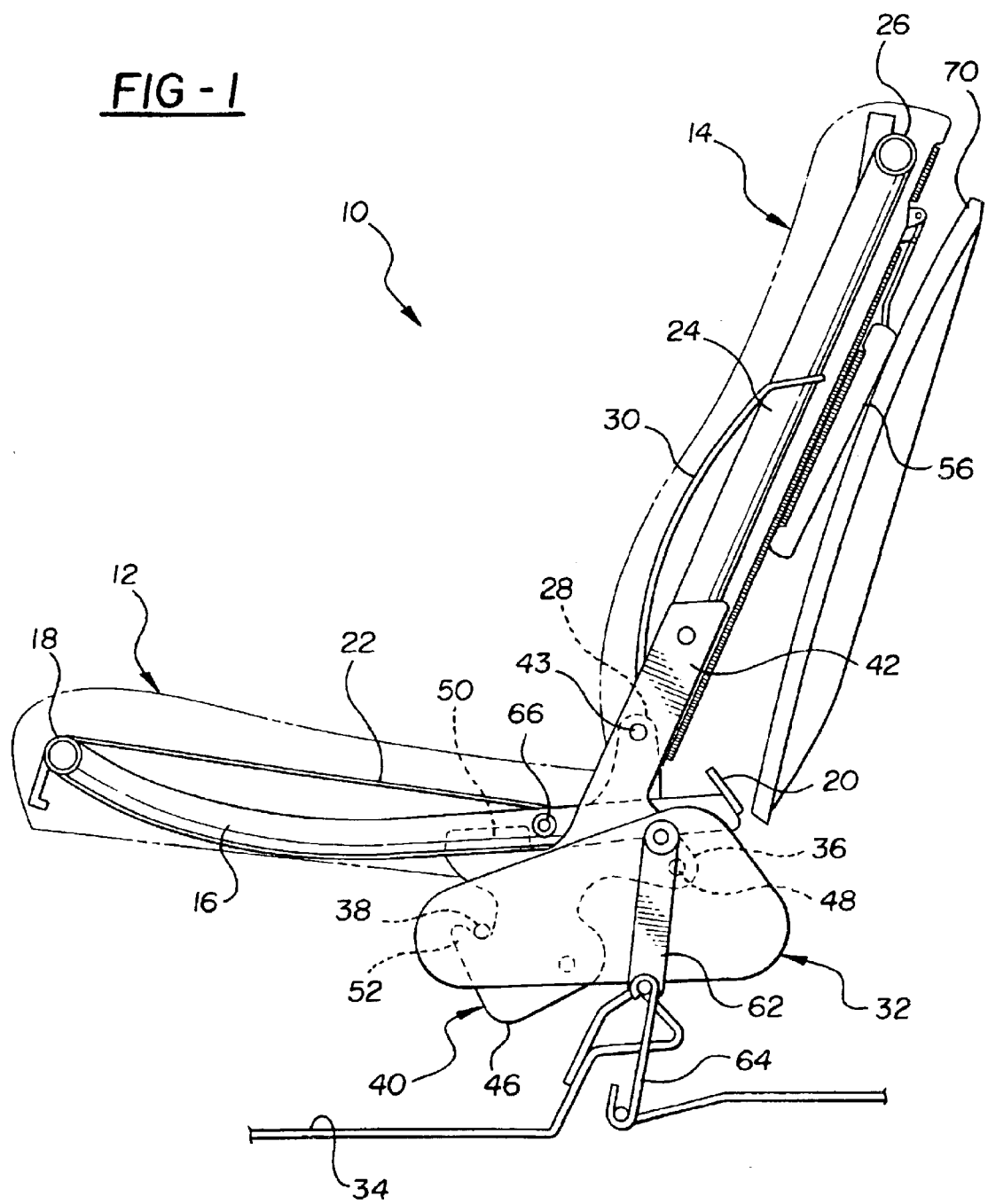
FIG. 1 is a side view of the seat assembly in an upright seating position.
Figure 2:
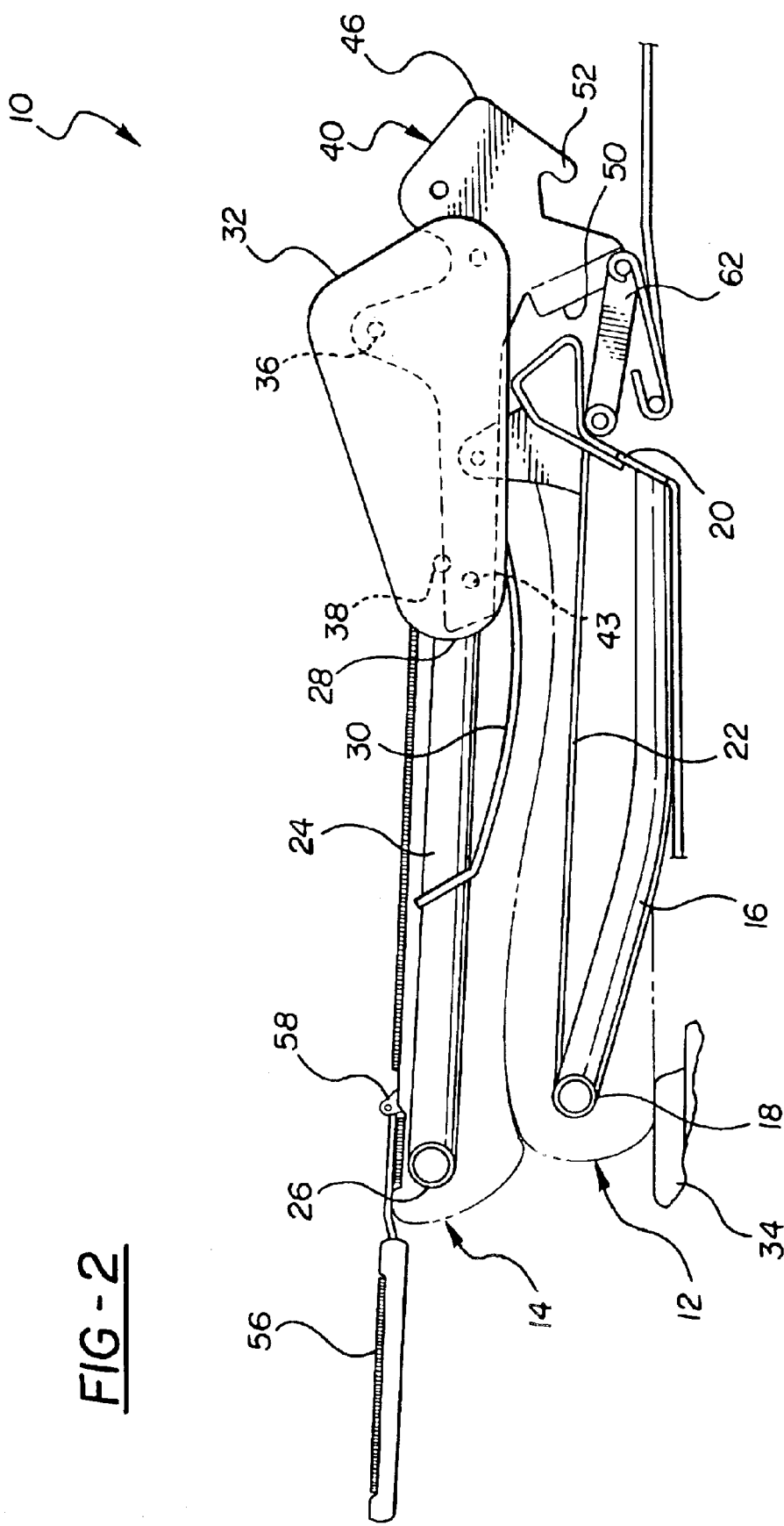
FIG. 2 is a side view of the seat assembly in a stow-to-floor position.

Referring to FIGS. 1 and 2, a seat assembly for use in an automotive vehicle is generally shown at 10 in a seating position. The seat assembly 10 includes a seat cushion 12 and a seat back 14. The seat cushion 12 includes a rigid seat cushion support frame 16 having a front cross bar 18 and a rear cross bar 20 each extending laterally between the opposing side walls of the interior of the vehicle. A flexible suspension mat 22 is supported between the front and rear cross bars 18, 20 for supporting a seated occupant on the seat assembly 10. The seat cushion frame 16 and suspension mat 22 are covered by a resilient contoured foam pad and trim cover as is commonly known in the art.

The seat back 14 similarly includes a seat back support frame 24 having an upper cross bar 26 and a lower cross bar 28 also each extending laterally between the opposing side walls of the interior of the vehicle. A flexible suspension mat 30 is supported between the upper and lower cross bars 26, 28 for supporting the seat occupant's back on the seat assembly 10. The seat back frame 24 and suspension mat 30 are covered by a resilient contoured foam pad and trim cover as is commonly known in the art.

A support bracket 32 is fixedly secured to each of the opposing side walls on the interior of the vehicle spaced above the floor 34 of the vehicle. The support brackets 32 support the seat assembly 10 above the floor 34 in the seating position. Each support bracket 32 includes a main pivot post 36 and a latch post 38 spaced forward of the main pivot post 36.

Referring to FIGS. 1–4, a pair of pivot brackets 40 pivotally support the seat assembly 10 between each of the support brackets 32. Described in greater detail below, the pivot bracket 40 supports both the seat cushion 12 and seat back 14 for movement between the seating position, shown in FIG. 1, and a stow-to-floor position, as shown in FIG. 2. Each pivot bracket 40 includes an elongated arm portion 42 extending between an upper end 44 and a lower end 46. The upper end 44 is fixedly secured to the seat back frame 24 and the lower end 46 is releasably engaged with the latch post 38 of the support bracket 32. The pivot bracket 40 further includes a pivot flange 48 projecting rearwardly from the arm portion 42 and disposed generally intermediate of the upper end 44 and the lower end 46. The pivot flange 48 is pivotally connected to the main pivot post 36 of the support bracket 32. The pivot bracket 40 also includes a generally L-shaped support flange 50 projecting forwardly from the arm portion 42 disposed generally between the upper end 44 and the lower end 46. The support flange 50 supports the seat cushion frame 16, and thus the seat cushion 12, cantilevered above the vehicle floor 34 in the seating position. The seat cushion 12 is pivotally coupled to the arm portion 42 by pivot 43. The lower end 46 of the pivot bracket 40 forms a hook portion 52 engagable with the latch post 38 to retain the seat assembly 10 in the seating position. A latch 54 is pivotally connected to the pivot bracket 40 for selectively engaging the latch post 38 together with the hook portion 52 for locking the seat assembly 10 in the seating position.

Figure 5:
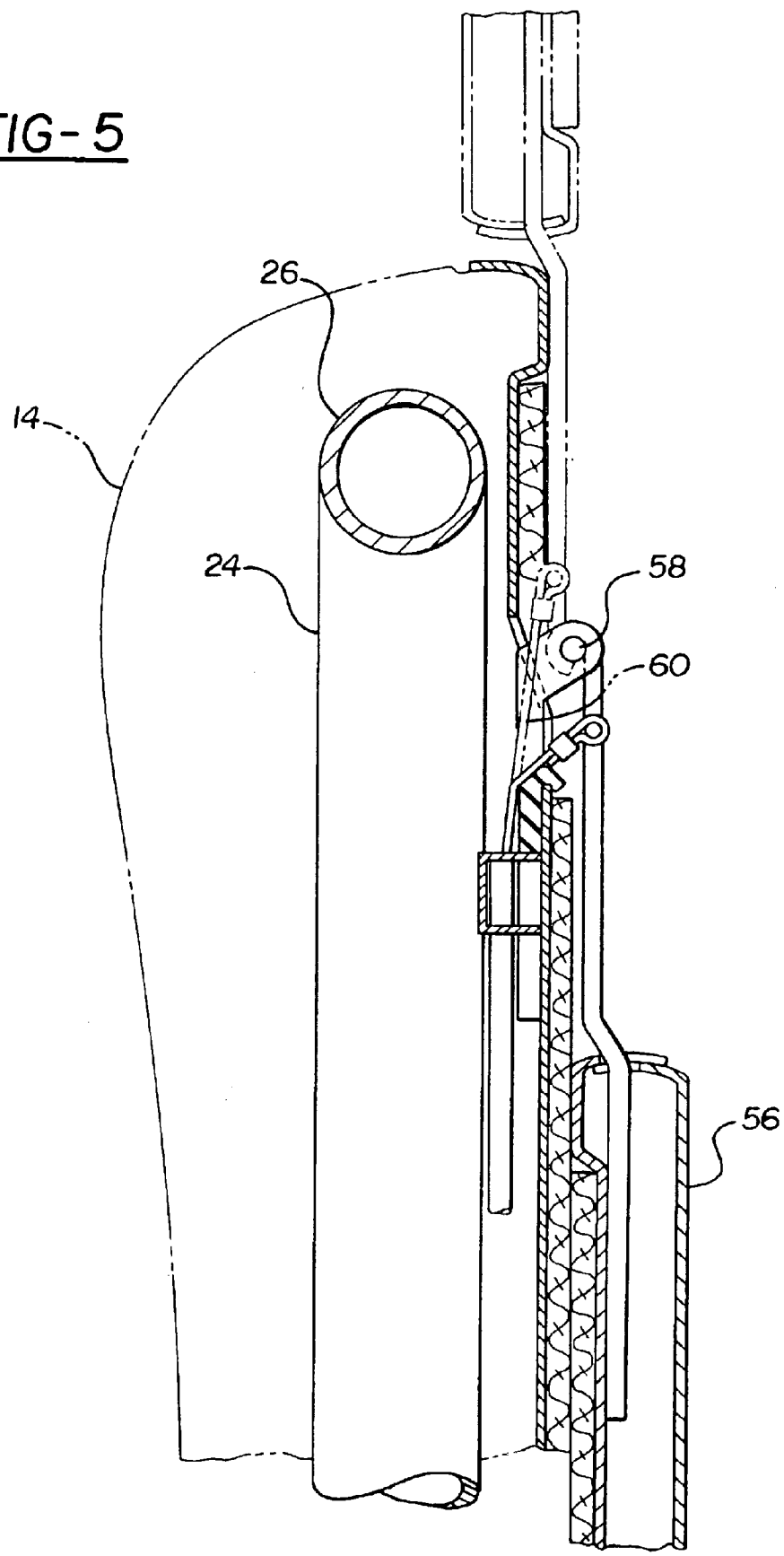
FIG. 5 is a side view of a release mechanism for releasing the seat assembly from the seating position to the stow-to-floor position.

Referring to FIG. 5, the seat assembly 10 further includes a flipper panel 56 pivotally coupled to the seat back 14 at pivot 58 for movement between an unreleased position supported against the backside of the seat back 14, as shown in FIG. 5, and a released position extending longitudinally from the top of the seat back 14. A cable 60 extends between the flipper panel 56 and the latch 54 for actuating the latch 54 in and out of engagement with the latch post 38 in response to movement of the flipper panel 56 between the unreleased and released positions.

Figure 3:
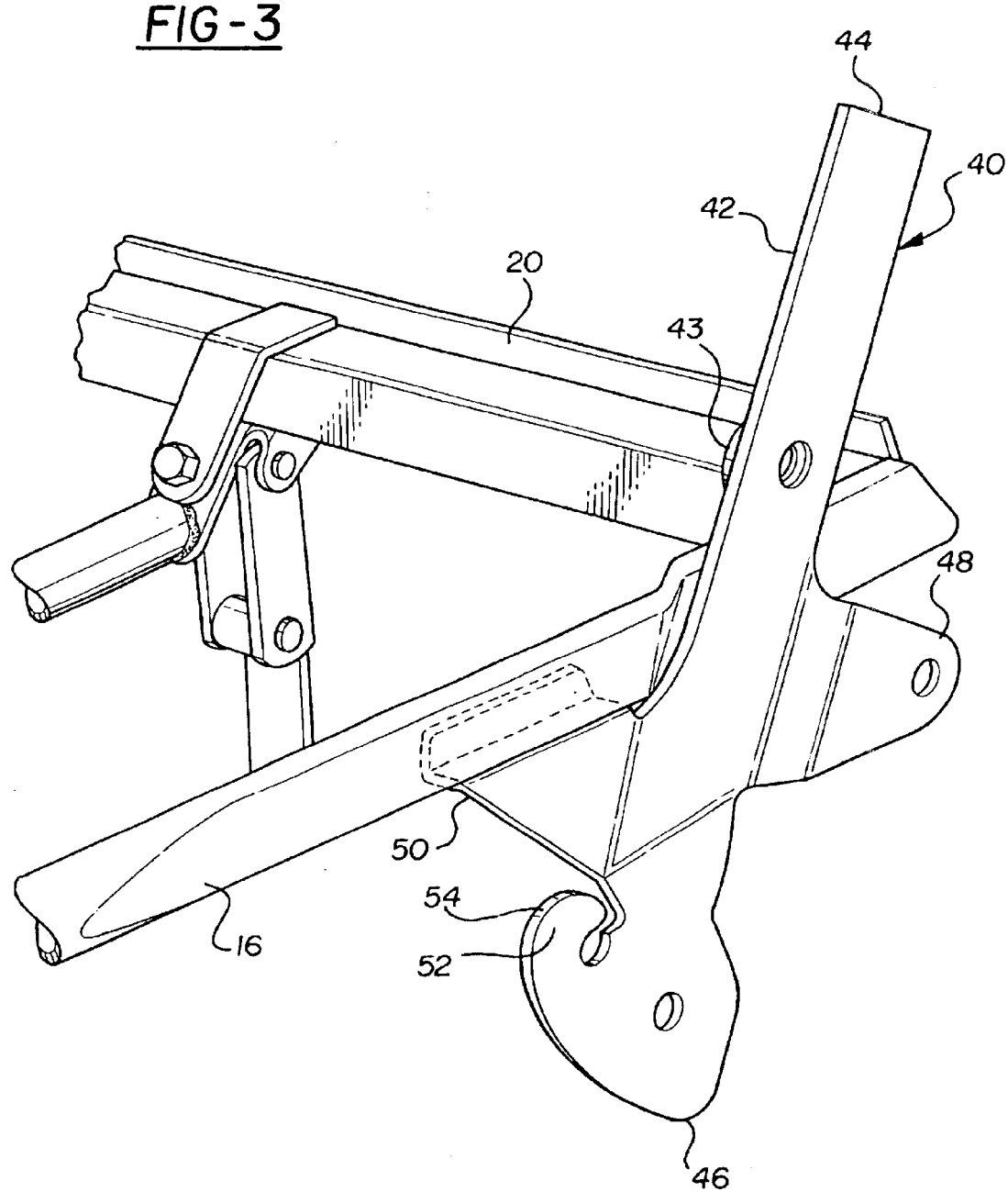
FIG. 3 is a perspective view of a pivot bracket for supporting and pivoting the seat assembly between the seating position and the stow-to-floor position.
Figure 4:
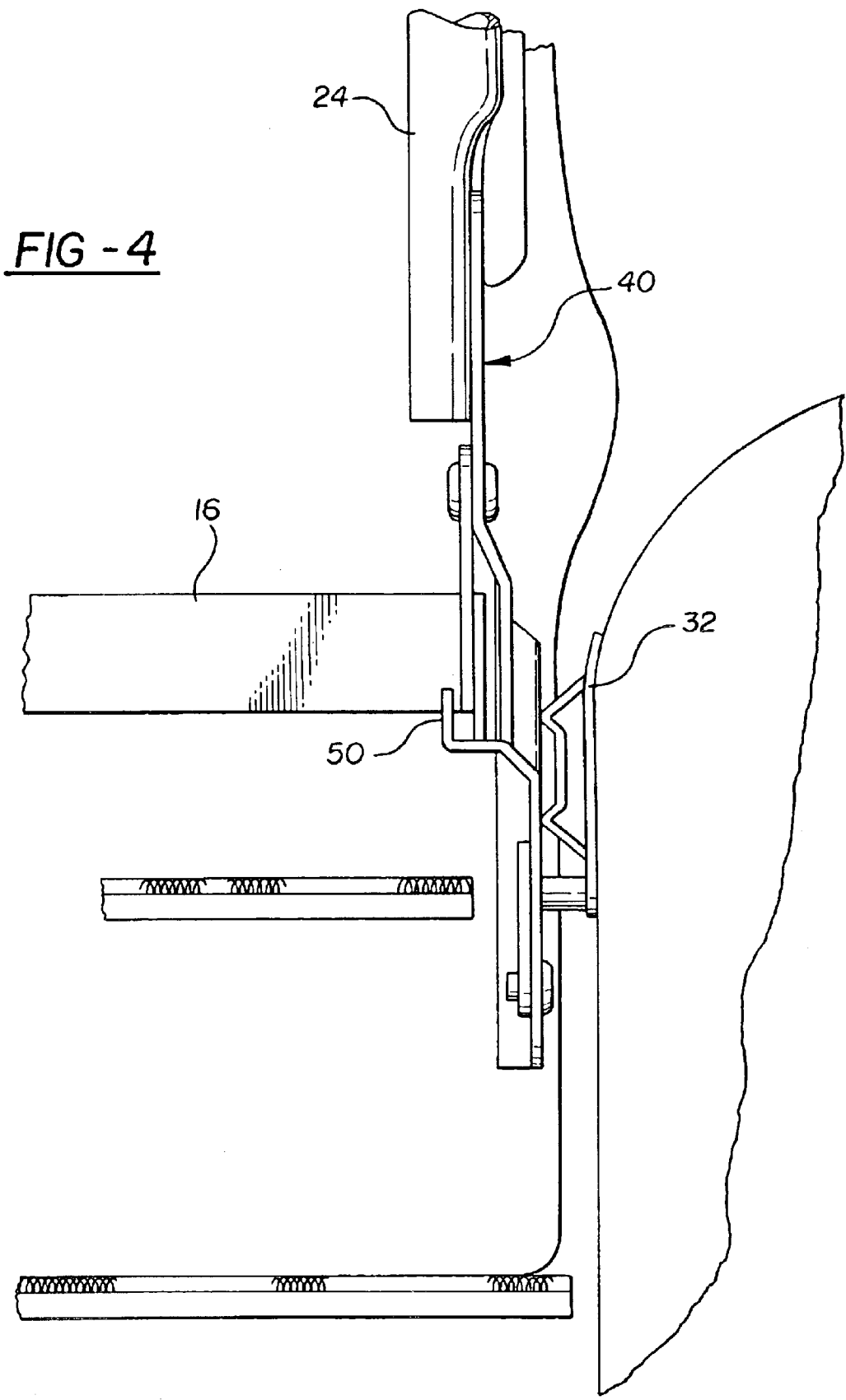
FIG. 4 is a front view of the pivot bracket supporting the seat assembly in the seating position.

The seat assembly 10 also includes a pair of seat belt anchors, shown in 62 in FIGS. 1, 2 and 3. The seat belt anchor 62 includes a linkage extending between one end pivotally connected to the seat cushion frame 16 and an opposite end pivotally connected to a floor anchor strap 64. The seat belts of the seat assembly 10 may be attached to the seat belt anchor 62 to transfer the seat belt loads from the seat 10 through the seat belt anchor 62 to the floor anchor 64.

In operation, the seat assembly 10 may be moved from the seating position to the stow-to-floor position by first rotating the flipper panel 56 counterclockswise, as viewed in FIGS. 1 and 2, to the released position. Rotation of the flipper panel 56 tensions and displaces the cable 60 to rotate the latch 54 out of locking engagement with the latch post 38. The seat assembly 10 is freely movable about the main pivot post 36 between the seating and stow-to-floor positions with the latch 54 disengaged with the latch post 38. A friction snubber 66 tucked between the seat cushion 12 and the pivot bracket 40 retains the seat cushion 12 in the seating position until the seat cushion 12 contacts the vehicle floor 34. That is, the entire seat assembly 10 pivots about the main pivot post 36 to lower the seat cushion 12 against the floor 34. Once the seat cushion 12 contacts the vehicle floor 34, the continued motion of the seat assembly 10 towards the stow-to-floor position folds the seat back 14 against the seat cushion 12. In the stow-to-floor position, the seat back 14 is stacked on top of the seat cushion 12 and the back side of the seat back 14 and the flipper panel 56 form a generally flat and planar load floor in the vehicle.

To return the seat assembly 10 from the stow-to-floor position to the seating position, the seat back 14 is pivoted about the main pivot post 36 in the clockwise direction, as viewed in FIGS. 1 and 2, until the hook portion 52 engages the latch post 38. Supported by the support flange 50, the seat cushion 12 is raised from the floor 34 to the seating position. Once the seat back 14 and seat cushion 12 are returned to the seating position, the flipper panel 56 is returned to the unreleased position against the back of the seat back 14. The tension in the cable 60 is released and the latch 54 engages the latch post 38 to lock the seat assembly 10 in the seat position.

Additionally, the seat assembly 10 may further include a trunk cover panel 70 pivotally connected to the floor 34 for covering a trunk compartment in the floor 34 of the vehicle. The trunk cover panel 70 may be latched in the closed position to cover the trunk compartment and form a planar portion of the floor 34 or pivoted upright to an open position and latched to the seat back 14 to provide access to the compartment. A latch of any suitable variety may releasably secure the trunk cover panel 70 to both the floor 34 and the seat back 14.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A stowable seat assembly for supporting occupants above a floor and between opposing lateral side walls of an automotive vehicle comprising:

a seat back extending between opposite lateral sides;

a seat cushion pivotally coupled to said seat back; and a pivot bracket fixedly secured to each of said opposite lateral sides of said seat back for supporting said seat assembly between the opposing lateral side walls of the vehicle, each of said pivot brackets including a support flange for supporting said seat cushion cantilevered from said pivot brackets spaced above the floor and a pivot flange adapted to be pivotally coupled to a main pivot post on the respective lateral side wall for pivoting said seat assembly between an upright seating position and a stow-to-floor position wherein said seat cushion is pivoted forwardly and downwardly to be supported on the floor and said seat back is pivoted against said seat cushion to form an extended cargo load floor.

2. A seat assembly as set forth in claim 1 wherein said pivot bracket includes an arm extending between an upper end fixedly secured to said seat back and an opposite lower end adapted to be releasably engagable with a latch post on the respective lateral side wall to retain said seat assembly in said upright seating position.

3. A seat assembly as set forth in claim 2 wherein said pivot bracket includes a hook portion formed in said lower end releasably engagable with the latch post on the respective lateral side wall to retain said seat assembly in said upright seating position.

4. A seat assembly as set forth in claim 3 wherein said pivot flange projects rearwardly from said arm intermediate of said upper end and said lower end.

5. A seat assembly as set forth in claim 4 wherein said support flange includes an L-shaped section projecting forwardly from said arm intermediate of said upper end and said lower end for supporting said seat cushion cantilevered from said pivot brackets spaced above the floor.

6. A seat assembly as set forth in claim 5 including a latch engagable with the latch post and pivotally assembled to said hook portion for releasably retaining the latch post therebetween, whereby said seat assembly is releasably locked in said seating position.

7. A seat assembly as set forth in claim 6 including a panel pivotally assembled to said seat back for movement between an unreleased position disposed against said seat back and a released position extending outwardly from said seat back to become flush with the extended cargo load floor, said panel operatively interconnected to said latch for releasing said latch from the latch post when moved between said unreleased position and said released position.

8. A seat assembly as set forth in claim 7 including a belt anchor for diverting seat belt loads to the vehicle floor comprising a linkage extending between one end pivotally assembled to said seat cushion and an opposite end pivotally assembled to the vehicle floor.

9. A seat assembly as set forth in claim 8 including a friction snubber nestled between said seat cushion and said pivot bracket for retaining said seat cushion in said seating position until seat cushion engages the vehicle floor while moving said seat assembly between said seating position and said stow-to-floor position.

* * * * *

UNITED STATES PATENT AND TRADEMARK OFFICE
CERTIFICATE OF CORRECTION

PATENT NO. : 6,874,840 B2
DATED : April 5, 2005
INVENTOR(S) : Colin G. Neale

It is certified that error appears in the above-identified patent and that said Letters Patent is hereby corrected as shown below:

<u>Title page,</u>
Item [57], ABSTRACT,
Line 1, please delete "automative" and substitute therefor, -- automotive --.

<u>Column 1,</u>
Line 5, please delete "December 11, 2005" and substitute therefor, -- December 11, 2000 --.

Signed and Sealed this

Seventh Day of June, 2005

JON W. DUDAS
*Director of the United States Patent and Trademark Office*